United States Patent [19]

Marciniak et al.

[11] 4,215,034
[45] * Jul. 29, 1980

[54] FLAME RETARDANT POLYMERIC COMPOSITIONS CONTAINING HALOGENATED DIELS-ALDER ADDUCTS WITH FURAN

[75] Inventors: Harry W. Marciniak, Tonawanda; Richard D. Carlson, Grand Island, both of N.Y.; James L. Dever, Brunswick, Ohio

[73] Assignee: Hooker Chemicals & Plastics Corp., Niagara Falls, N.Y.

[*] Notice: The portion of the term of this patent subsequent to Nov. 9, 1993, has been disclaimed.

[21] Appl. No.: 739,875

[22] Filed: Nov. 8, 1976

Related U.S. Application Data

[63] Continuation-in-part of Ser. No. 190,271, Oct. 18, 1971, Pat. No. 3,991,011, which is a continuation-in-part of Ser. No. 157,627, Jun. 28, 1971, abandoned, which is a continuation of Ser. No. 847,430, Aug. 4, 1969, abandoned.

[51] Int. Cl.² ............................................. C08K 5/15
[52] U.S. Cl. ............................................. 260/45.8 A
[58] Field of Search .................. 260/346.2 M, 30.4 R, 260/45.8 A

[56] References Cited

U.S. PATENT DOCUMENTS

| 3,632,544 | 1/1972 | Boyer | 260/30.4 R |
| 3,687,983 | 8/1972 | Dever | 260/346.2 M |
| 3,991,011 | 11/1976 | Marciniak | 260/30.4 R |

OTHER PUBLICATIONS

Hooker Chemical Corporation, "Fire-Retardant Additives for Elastomers", Nov., 1970.

*Primary Examiner*—Paul R. Michl
*Attorney, Agent, or Firm*—Peter F. Casella; William J. Crossetta, Jr.

[57] ABSTRACT

Thermoplastic elastomers having fire retardancy and improved properties are provided by incorporating therein, Diels-Alder diadducts of polyhalogenated cyclopentadienes and a substituted or non-substituted furan.

7 Claims, No Drawings

FLAME RETARDANT POLYMERIC COMPOSITIONS CONTAINING HALOGENATED DIELS-ALDER ADDUCTS WITH FURAN

REFERENCE TO PRIOR APPLICATION

This is a continuation in part of copending application Ser. No. 190,271, filed Oct. 18, 1971, now U.S. Pat. No. 3,991,011, which is a continuation in part of Ser. No. 157,627, filed June 28, 1971, now abandoned, which is a continuation of copending application Ser. No. 847,430, filed Aug. 4, 1969, now abandoned.

BACKGROUND OF THE DISCLOSURE

The use of organic compositions, particularily those grouped together in the broad class of polymeric materials and coatings, is expanding each year. These materials find wide application as wire coatings, pipes, conduits and other industrial moldings and extruded products, as well as in paints, films, coatings, and miscellaneous products. These and other uses are better served by polymeric compositions that are fire retardant or flame resistant.

Accordingly, it is the object of this invention to provide fire retardant polymeric compositions. It is also the object of this invention to provide fire retardant polymeric compositions which have improved properties. These and other objects will become apparent to one skilled in the art from the following detailed description.

SUMMARY OF THE INVENTION

This invention relates to certain embodiments of thermoplastic elastomers having fire retardancy and improved properties. More particularly, this invention relates to such polymeric compositions having fire retardance and improved properties which are provided by incorporating therein Diels-Alder adducts of polyhalogenated cyclopentadienes and substituted or non-substituted furans, and auxiliary retardant additives, which adducts and additives are disclosed in copending application Ser. No. 190,271, filed Oct. 18, 1971, the disclosure of which is incorporated herein by reference.

DESCRIPTION OF THE PREFERRED EMBODIMENTS

In accordance with this invention, there are provided fire retardant compositions by incorporating into the polymeric material, a fire retardant amount of Diels-Alder adduct of a polyhalogenated cyclopentadiene and a furan compound. The polyhalogenated cyclopentadiene compounds have the formula

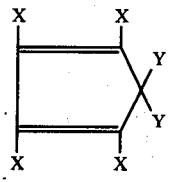

wherein X is selected from the group consisting of fluorine, chlorine, and bromine and Y is selected from the group consisting of fluorine, chlorine, bromine, alkyl of 1 to 10 carbon atoms and alkoxy of 1 to 10 carbon atoms, said cyclopentadiene containing at least 4 and preferably 6 halogen substituents. The alkyl and alkoxy radicals preferably have 1 to 6 carbon atoms and can be halo substituted, i.e., with fluorine, chlorine or bromine.

The polyhalogenated cyclopentadienes, the furan compounds, the Diels-Alder adducts of the invention and processes for making such adducts are disclosed in the above-referenced application Ser. No. 190,271 and in U.S. Pat. No. 3,687,983, the disclosure of which is also incorporated herein by reference.

Thermoplastic elastomers are thermoplastic materials which meet the ASTM definition of an elastomer as a material which at room temperature can be stretched repeatedly to at least twice its original length and, upon release of the stress, will return immediately with force to its approximate original length. They have their elastomeric properties built in and chemical crosslinking does not occur in processing the materials, as disclosed in the 1975-1976 Modern Plastics Encyclopedia, page 94, 96 and 98, the disclosure of which is incorporated herein by reference. The thermoplastic elastomers embraced within the scope of this invention include polyurethanes, such as polyester urethanes, polyether urethanes and polycaprolactone urethanes; copolyester elastomers of three or more components selected from dicarboxylic acids and glycols; styrene-butadiene radial copolymers, styrene-isoprene block copolymers, styrene-olefin block copolymers, such as styrene-hydrogenated polybutadiene copolymers and styrene-hydrogenated polyisoprene copolymers; olefin block copolymers, such as ethylene propylene block copolymers, and polyisobutylene elastomers.

The polymers of the invention can be in various physical forms, such as shaped articles, for example, moldings, sheets, rods, and the like; fibers, coatings, films and fabrics, and the like.

The halogenated Diels-Alder adducts in the present compositions are desirably incorporated in the polymeric materials in an effective fire retardant amount. Generally, halogenated Diels-Alder adducts in the amount of from about 2 to about 50 percent by weight of the polymeric composition and desirably from about 5 to about 40 percent by weight of the polymeric composition and preferably from about 10 to 35 percent by weight are mixed with polymeric composition. Improved fire retardance can be provided by incorporating metallic compounds, wherein the metal is selected from the group consisting of antimony, arsenic, bismuth, zinc, iron, tin and aluminum, in the polymeric compositions in the amount of about 1 to about 30 percent by weight of said polymeric composition, preferably about 2 to 25 percent.

The oxides of the above-described metals can be used. Antimony oxide is the antimony compound that is presently preferred for use in the present invention. However, many antimony compounds are suitable such as those disclosed in above referenced application Ser. No. 190,271.

The components comprising the compositions of the instant invention can be mixed by any one of several methods. The additives can be introduced into the polymer while the latter is dissolved in a suitable solvent. This procedure is especially useful when it is desired to mix the additive during the polymer manufacturing process. When the polymer is subsequently recovered from the solvent, the additives are intimately mixed with the polymer. Usually the additives are mixed with the polymer in the molten state and temperatures that can range from the melting point to the decomposition temperature of the polymer, e.g., from 20 to 315 degrees centigrade. Alternatively, the additives and polymer are dry-blended in the finely-divided state so that an intimate mixture is obtained upon subsequent molding or extrusion.

The following examples serve to illustrate the invention but are not intended to limit it. Unless specified otherwise in this specification and claims, all temperatures are in degrees centigrade and parts are understood to be expressed in parts by weight.

EXAMPLE 1

Polymer compositions were prepared by compounding 80 parts of a thermoplastic polyurethane prepared from a butanediol adipate polyester having a hydroxyl number of 87 to which was added sufficient butanediol to raise the hydroxyl number to 175, followed by chain extension with methylene bisphenyl isocyanate at a ratio of one isocyanato group per hydroxyl group, 15 parts of the diadduct of hexachlorocyclopentadiene and furan (F-2C), and 5 parts of antimony trioxide, and tested for fire retardancy by ASTM D-635, ASTM D-2863 and UL-94 test procedures. Comparative tests with the base polymer and with 15 parts of the diadducts of hexachlorocyclopentadiene and 1,5-cyclooctadiene (COD) were also conducted. The test results are shown in Table 1.

EXAMPLES 2-6

Compositions were prepared as in Example 1 utilizing different thermoplastic elastomers and proportions of components as shown in Table 1 and 2. The compositions were tested and found to have the results shown in Tables 1 and 2. The following thermoplastic elastomers were employed.

| Example | Thermoplastic Elastomer |
|---|---|
| 2 | Solprene 411P, a styrene butadiene radial copolymer, with styrene nucleus and butadiene termination (Phillips Chemical Company) |
| 3 | Kraton 1107; a styrene olefin block copolymer, with polystyrene end blocks and polyisoprene midblocks (Shell Chemical Company) |
| 4 | Kraton G 1650, a styrene olefin block copolymer, with polystyrene end blocks and hydrogenated polybutadiene midblocks (Shell Chemical Company) |
| 5 | Hytrel 6345; a copolyester elastomer of terephthalic acid, polytetramethylene ether glycol and 1,4-butanediol (E.I. DuPont de Nemeurs Company) |
| 6 | TPR 1922; a polypropylene-ethylene block copolymer (Uniroyal) |

TABLE 1

| Example | 1 | | | 2 | | | 3 | | |
|---|---|---|---|---|---|---|---|---|---|
| Composition | A | B | C | A | B | C | A | B | C |
| Polyurethane, % | 100 | 80 | 80 | — | — | — | — | — | — |
| Styrene Butadiene Radial Copolymer, % | — | — | — | 100 | 60 | 60 | — | — | — |
| Styrene Isoprene Block Copolymer, % | — | — | — | — | — | — | 100 | 60 | 60 |
| Furan Adduct, % | — | 15 | — | — | 35 | — | — | 35 | — |
| Cyclooctadiene Adduct, % | — | — | 15 | — | — | 35 | — | — | 35 |
| Antimony Trioxide, % | — | 5 | 5 | — | 5 | 5 | — | 5 | 5 |
| Oxygen Index (ASTM D2863) | 25.4 | 27.5 | 28.2 | 18.4 | 31.2 | 29.9 | 17.8 | 29.6 | 25.3 |
| ASTM D635, Flame-out, seconds | 5.4 | 4.6 | <1 | burns | 1.4 | <1 | burns | <1 | 3.3 |
| UL-94 (1/8" bar) Class | V-2 | V-0 | V-0 | None | V-0 | V-0 | None | V-0 | V-0 |

TABLE 2

| Example | 4 | | | 5 | | | 6 | | | |
|---|---|---|---|---|---|---|---|---|---|---|
| Composition | A | B | C | A | B | C | A | B | C | D |
| Styrene Olefin Block Copolymer, % | 100 | 60 | 60 | — | — | — | — | — | — | — |
| Polyester Elastomer, % | — | — | — | 100 | 60 | 60 | — | — | — | — |
| Polyolefin Elastomer, % | — | — | — | — | — | — | 100 | 60 | 50 | 60 |
| Furan Adduct, % | — | 35 | — | — | 35 | — | — | 35 | 35 | — |
| Cyclooctadiene Adduct, % | — | — | 35 | — | — | 35 | — | — | — | 35 |
| Antimony Trioxide, % | — | 5 | 5 | — | 5 | 5 | — | 5 | 5 | 5 |
| Zinc Borate (Firebrake ZB), % | — | — | — | — | — | — | — | — | 10 | — |
| Oxygen Index (ASTM D2863) | 18.1 | 30.8 | 32.7 | 19.5 | 38.4 | 36.6 | 18.5 | 27.6 | 30.3 | 29.1 |
| ASTM D635, Flame-out, seconds | burns | <1 | <1 | burns | <1 | <1 | burns | <1 | <1 | <1 |
| UL-94 (⅛" bar) Class | None | V-0 | V-0 | None | V-0 | V-0 | None | None | V-0 | V-1 |

Various changes and modifications can be made in the products of the instant invention without departing from the spirit and the scope thereof. The various embodiments of the invention disclosed herein serve to further illustrate the invention but are not intended to limit it.

We claim:

1. A fire retardant polymeric composition comprising a thermoplastic elastomer selected from the group consisting of a polyurethane, a co-polyester elastomer, a polyisobutylene elastomer, and an effective fire retardant proportion of a compound of the formula:

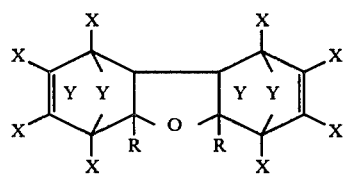

wherein X is selected from the group consisting of fluorine, chlorine, and bromine, Y is selected from the group consisting of fluorine, chlorine, bromine, alkyl, haloalkyl, alkoxy and haloalkoxy and each R is individually selected from the group consisting of hydrogen and alkyl.

2. The composition of claim 1 wherein a compound of a metal selected from the group consisting of antimony, arsenic, bismuth, zinc, iron, tin, and aluminum is incorporated therein.

3. The composition of claim 2 wherein said compound of antimony is antimony trioxide.

4. The composition of claim 3 wherein X is selected from the group consisting of chlorine and bromine, Y is selected from the group consisting of chlorine and bromine, and wherein R is selected from the group consisting of hydrogen and methyl.

5. The composition of claim 4 wherein the compound of the formula is 1,2,3,4,6,7,8,9,10,10,11,11-dodecachloro-1,4,4a,5a,6,9,9a,9b-octahydro-1, 1,4:6,9-dimethanodibenzofuran.

6. The composition of claim 5 wherein the thermoplastic elastomer is a polyurethane.

7. The composition of claim 5 wherein the thermoplastic elastomer is a copolyester elastomer.

* * * * *